July 19, 1949.    G. D. SCOTT    2,476,566
TUBULAR MEMBER CONNECTION
Filed Aug. 6, 1945
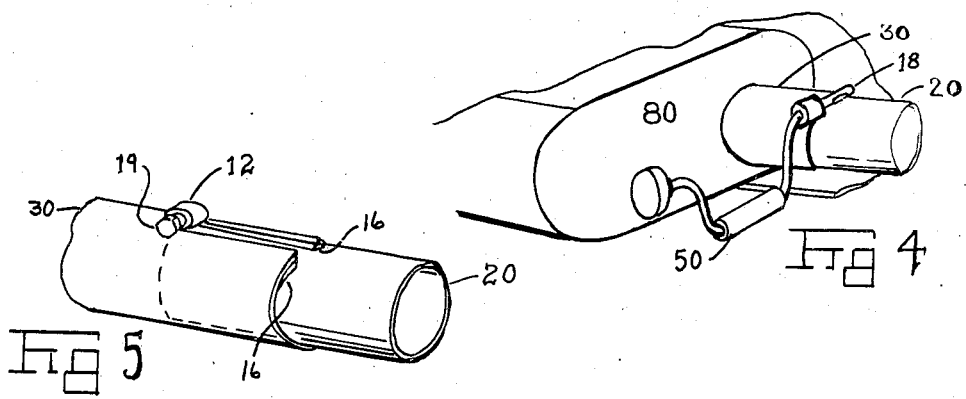
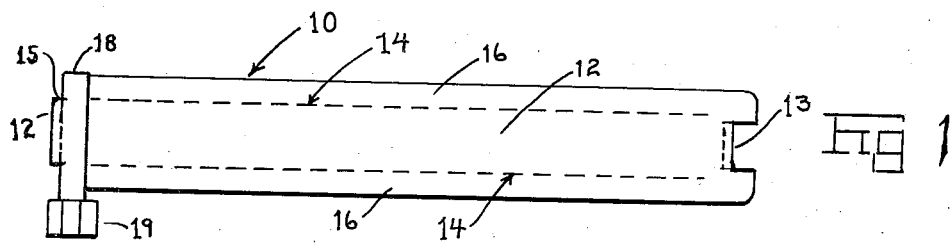
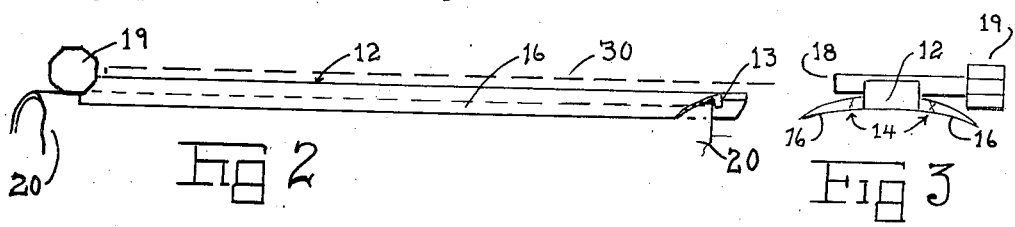
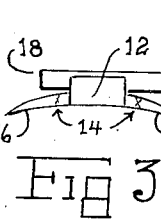
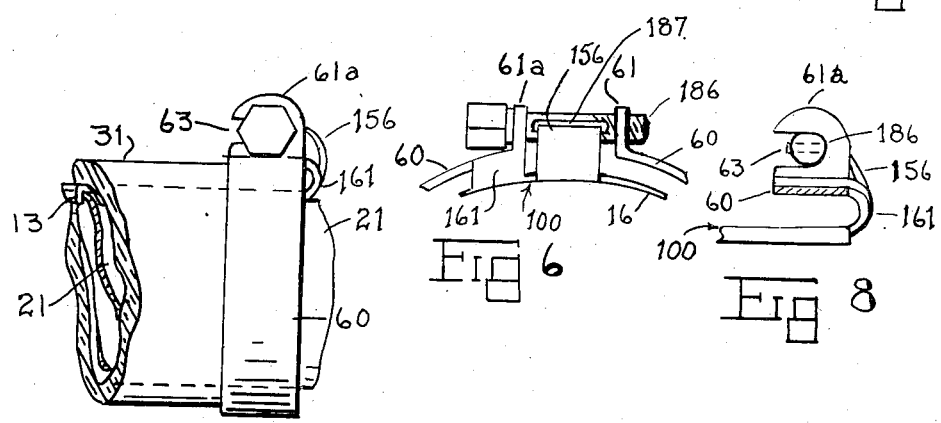
INVENTOR
George D. Scott
BY
Myron P. Loughlin
ATTORNEY Patented July 19, 1949

2,476,566

UNITED STATES PATENT OFFICE 2,476,566

TUBULAR MEMBER CONNECTION

George D. Scott, St. Petersburg, Fla., assignor to Myron P. Laughlin, Gulfport, Fla.

Application August 6, 1945, Serial No. 609,157

10 Claims. (Cl. 285—77)

This invention relates to tubing connection and disconnection devices and more particularly to tube connections wherein the joined tubes are of such material and used under such circumstances that the joint therebetween becomes corroded and must be torn apart to separate the tubes.

The object of my invention will be illustrated by its use in connection with the thin walled tubes commonly used for the exhaust pipes of automobiles and for connecting the muffler therewith but it will readily be seen that it is equally adaptable to the other tubes and conduits of the automobile and to tubing wherever employed.

The effect of exhaust products on mufflers and tailpipes of gasoline motors is well known; often the life of a muffler or other part of the automobile exhaust system is measured in weeks and the replacement job must be done before the motor can again be operated with safety to the passengers. The job of removing mufflers and tail pipes invariably involves disconnecting joints which have been well corroded by the same elements which have eaten holes in the parts to be replaced. The common method of disconnection has been by hammer and chisel which not only involved hard labor and time but usually destroyed both the female and male ends together with the usefulness of the muffler and tailpipe although only one of these might have failed and really require replacement. The present invention provides not only for almost instantaneous disconnection but also for making this disconnection without injury to the male tube and with a minimum of injury to the female tube end. Resultant saving in both man-hours and materials will be obvious as will the usefulness of this invention for other purposes of rapid easy tube separation whether in connection with internal combustion engine tubings or elsewhere.

In the modifications shown for purposes of illustration in the attached drawing:

Fig. 1 is a top view of a preferred form of my device.

Fig. 2 is a side view of a slightly modified form of the device in Fig. 1.

Fig. 3 is an end view of the device of Fig. 1 and Fig. 2.

Fig. 4 shows the device of the previous figures being used.

Fig. 5 serves to show the tubing joint broken but still in its original position.

Fig. 6 is a fragmentary view taken from the end of a further modification of my invention.

Fig. 7 shows the complete device, of which Fig. 6 shows a part and is taken from the side.

Fig. 8 discloses a detail of the device shown in Figs. 6 and 7.

Referring to Figs. 1 to 5 inclusive: The metal strip 10 is relatively thick at its central portion 12 which is partially severed by scorings or grooves 14 from the outer sealing portions or fins 16. Central portion 12 is provided at one end with a lug 13 which may be bent from the strip metal to engage the inner end of the male end (inner tube) of the joint when this strip is in place between the two tube ends in the joint. Reference to Fig. 5 will show this more clearly—inner (male) tube being indicated at 20 and outer (female) tube at 30. Fig. 2 indicates these tubes and their overlapping relationship at the joint with the strip 10 inserted so that the lug 13 prevents endwise withdrawal while fins 16 seal the sides against leakage and permit portion 12 to be made of sufficient thickness and of such strength that its outer end 15 may be welded to a stub shaft 18 having a head 19 which is preferably similar in form to a standard bolt head so that it may be engaged by a standard wrench as shown in Fig. 4. Fig. 4 will show that the mechanic may remove any muffler or tailpipe joint from beneath the car when my device has been installed, by applying a speed wrench 50 and turning shaft 18 to roll the central portion 12 thereupon—thus tearing this portion loose from the sealing portions 16 and ripping the outer tube 30 of the joint as indicated in Fig. 5. This of course breaks the joint and muffler 80 or the tailpipe which forms an extension of tube 30 may be taken out at once.

It is understood that the tubing employed for the purposes described is relatively thin and tearable metal for the most part and is preferably, but not necessarily, weakened by means of a score in its surface to direct and assist the tearing of the metal by the ripping means described when relatively heavy gauge metal is employed.

Fig. 6 and Fig. 7 will show that, particularly where the outer tube 31 is of rubber or the like, the outer clamp 60 used to compress the outer tube upon the inner tube 21 may be provided with a threaded shaft 186 which has a slot 187 to receive the end 156 of portion 12 after the threads which hold clamp 60 together have been released. Portion 60 is provided with the usual ears 61 one of which is threaded to engage the shaft 186 and the other of which is slotted as at 63 so that when shaft 186 has been revolved as in Fig. 4 to release the clamp 60's outer compression on tube 31 and to disengage the thread thereon from ear 61 shaft 186 will be free to roll strip portion 12 back as has been described in connection with the previously described embodiment. Strip 100 is provided with an extension on one of the sealing fins 16 whereby it joins with and becomes a part of clamp 60.

Other embodiments of the idea of means hereing disclosed will be immediately obvious to those skilled in the art; manifestly the value of this invention lies in its simple solution of a very real problem and affords a substantial saving in time, materials and effort while affording aid toward keeping our vitally important trucks and passenger cars in operating condition on the road rather than in the repair shop awaiting attention. That some of the elements and means which have been disclosed herein may be incorporated in the tubing itself or applied in whole or in part on original installation will of course be obvious as will the speed and facility of replacement thereby obtained when such becomes necessary in war or in peace.

What I claim is:

1. A tubular member connection disconnection device comprising a metal strip having a tearing section, sealing sections, anchoring means and means for coiling the strip on itself to separate said tearing section from said sealing sections.

2. In an automobile muffler removal device, a strip insertible between the muffler nipple and the tailpipe, said strip having an anchor projection on its innermost end and a roll shaft on its outer end provided with a wrench head, said wrench head providing means to turn said roll shaft and roll the body of the strip thereon the other end of said strip being held by said anchor.

3. The means for removing exhaust tubing connections which comprises a roll shaft, a tearing strip operated by said shaft, means for securing the strip to one of the connected tubes, and means for operating said roll shaft to wind the said strip thereon whereby the wall of one of said tubes is torn open by withdrawal of the strip.

4. A tubular member connection device comprising a clamp on the outer tube, a strip between the connected tubes, a screw shaft engaged with the ears of said clamp to compress the same and released therefrom to free the clamp, said shaft having a slot therein for the end of the aforesaid strip to roll the same thereon and draw the strip forcibly from between the connected tubes to free the same one from the other.

5. An automobile exhaust pipe connection freeing device having a roller attached to the outer pipe adjacent the pipe connection and a driver means for said roller to roll the same longitudinally of the pipe whereby the said outer pipe is cut lengthwise to free the inner pipe of the connection.

6. In a tubular member connector cutter, a tear strip having a substantially crescent shaped cross-section with relatively heavy central section and thinned out edge sections, said central section being made heavy to withstand cutting stresses and said edge sections thinned to seal the space between the central section and the tubular member walls.

7. An automobile exhaust pipe disconnector including a pipe cutting device secured to one of the joined pipes and partially enclosed within the other said pipe and leverage engagement means upon the exterior of the pipes whereby leverage may be applied to forcibly pull said cutting device through that portion of the joined pipe which originally enclosed it.

8. In an automobile exhaust tubing joint disconnecting device means engaging one of the joined tubes including a tube tearing strip provided with an anchor and a tool engagement means at the ends thereof and with sealing strips at the edges thereof said anchor providing for the engagement aforesaid said sealing strips closing the opening between the joined tubes wherein the tearing strip is inserted and said tool engagement means providing attachment for a leverage tool to tear the said tearing strip through the wall of one of the joined tubes to release the tubes one from the other.

9. In an automobile exhaust pipe and muffler remover, a tube slitter, having engagement means for attachment to the tube joint between the pipe and the buffler and leverage applicator means for attachment of added leverage to operate said slitter to slit the outermost tube of the joint whereby the tubes forming the joint between pipe and muffler may be almost instantly separated and the same removed for replacement.

10. In combination with a coupling for fluid tight conduits, comprising male and female pipe sections, of means for destroying said coupling, said means comprising a rip tool secured to a portion of the female pipe section at the end thereof, and means on said tool by which said tool is rotated to remove a portion of the female pipe section.

GEORGE D. SCOTT.

REFERENCES CITED

The following references are of record in the file of this patent:

UNITED STATES PATENTS

| Number | Name | Date |
| --- | --- | --- |
| 145,641 | Fritsch | Dec. 16, 1873 |
| 1,568,437 | Bach | Jan. 5, 1926 |
| 2,073,636 | Holoubeck | Mar. 16, 1937 |
| 2,089,940 | Broun | Aug. 17, 1937 |